United States Patent
Johnson

[11] 3,892,022
[45] July 1, 1975

[54] ROUGHING HOB

[75] Inventor: Stuart J. Johnson, Rockford, Ill.

[73] Assignee: Barber-Colman Company, Rockford, Ill.

[22] Filed: May 10, 1974

[21] Appl. No.: 468,914

[52] U.S. Cl. ............................ 29/103 B; 29/103
[51] Int. Cl.[2] ................................ B26D 1/12
[58] Field of Search .......... 29/103 R, 103 A, 103 B, 29/105 R, 105 A

[56] References Cited
UNITED STATES PATENTS

| | | | |
|---|---|---|---|
| 93,212 | 8/1869 | Reiss | 29/103 R |
| 1,492,505 | 4/1924 | Bonnaffous et al. | 29/103 R |
| 2,881,508 | 4/1959 | Linder | 29/105 R |
| 3,117,366 | 1/1964 | Castor, Sr. | 29/103 R |
| 3,574,911 | 4/1971 | Penoyar | 29/105 A |
| 3,688,368 | 9/1972 | Bodem | 29/105 R |
| 3,715,789 | 2/1973 | Johnson | 29/103 B |

*Primary Examiner*—Harrison L. Hinson
*Attorney, Agent, or Firm*—A. Richard Koch

[57] ABSTRACT

A roughing hob for generating gears has an undulating cutting edge profile to leave alternating heavy and light sections of material to be removed from the gear in the finishing operation. Chips are therefore more efficiently broken during the finishing operation to provide better heat dissipation and longer finishing tool life.

10 Claims, 5 Drawing Figures

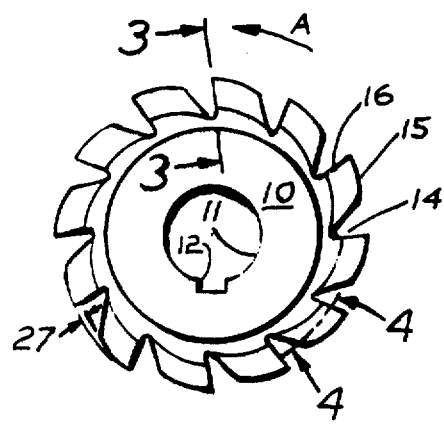
FIG. 1
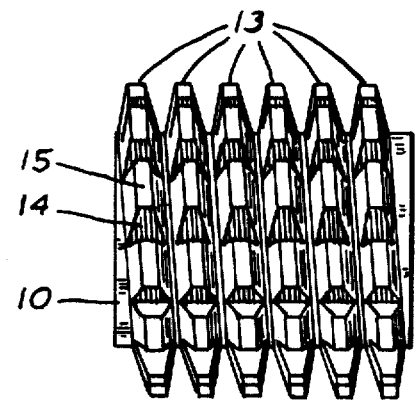
FIG. 2
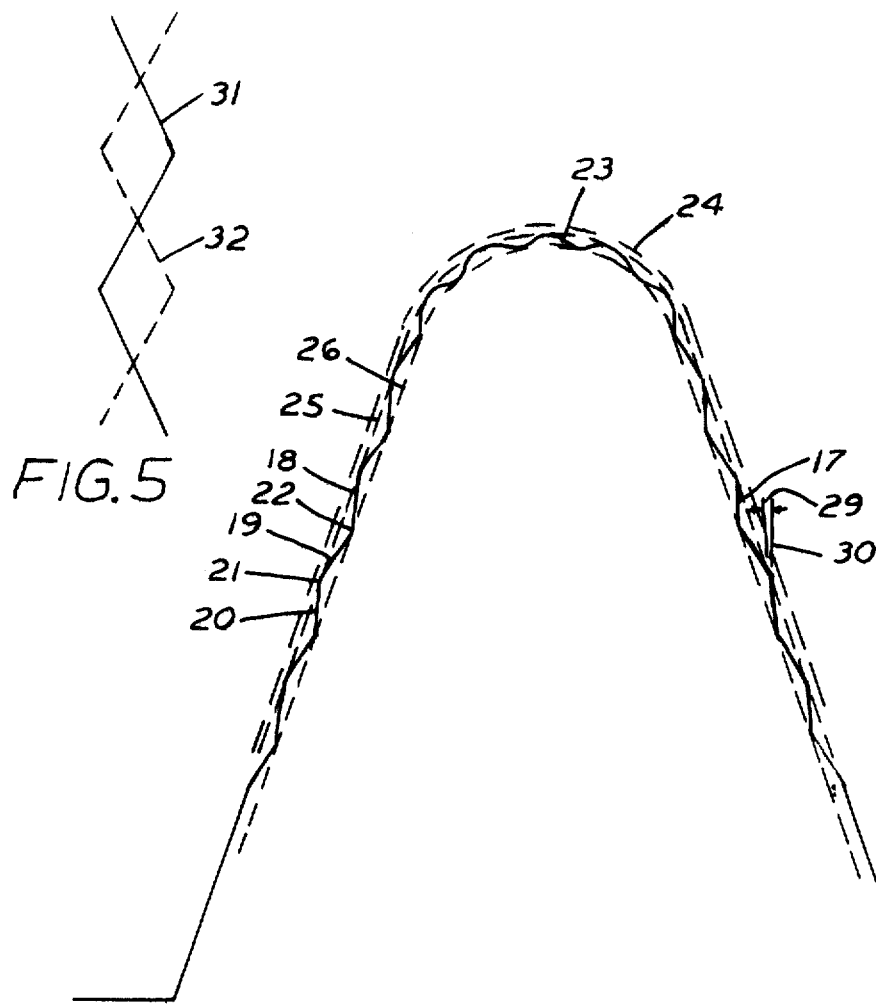
FIG. 5
FIG. 3
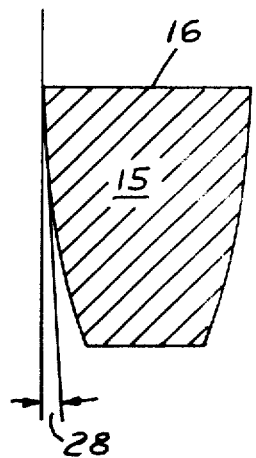
FIG. 4

3,892,022

ROUGHING HOB

BACKGROUND OF THE INVENTION

This invention relates to roughing hobs used to generate gears, sprockets, splines and the like. When hobbing gears it has been found desirable to generate the teeth by a rough hobbing operation in order to remove large amounts of metal quickly, followed by a finishing operation to more slowly produce an accurate tooth form. Such a procedure increases the life of the highly refined and relatively expensive finishing tool. The profile of a rough cut gear tooth is dependent upon the profile of the cutting edges on the roughing hob generating it. Generally the profile of the cutting edges has closely approached that required to produce a finished gear. In my U.S. Pat. No. 3,715,789, issued on Feb. 13, 1973, I disclosed that the amount of material to be removed in the finishing operation need not be uniform along the surface of the tooth, but may be varied in order to minimize stresses on both the gear tooth and the finishing tool. I further disclosed that the final rough gear tooth profile may be generated by a plurality of separate cutting edges, each edge cutting a predetermined portion of the rough gear tooth profile. Eberhardt in U.S. Pat. No. 874,886, issued on Dec. 24, 1907, disclosed stepped peripheral cutting edges in a circular disc cutter, which Bonnaffous et al in U.S. Pat. No. 1,492,505, issued on Apr. 29, 1924, disclosed chip breakers in the form of shallow grooves in the cutting edges, the grooves being staggered from one cutting edge to the next to produce in combination a finished tooth profile.

SUMMARY OF THE INVENTION

According to the present invention, a roughing hob has a cutting edge with an undulating profile. Such a profile results in more easily broken chips, a reduction in chip build-up, a reduction in temperature at the cutting edge, easier cutting and longer life for the roughing hob. Perhaps of greater importance is the effect of the undulating profile on the work-piece. During the finishing operation material of varying thickness must be removed as a result of the undulating profile on the workpiece. This produces weak sections in the material removed in the finishing operation with consequent easy chip breakage. Under these conditions there is a reduction in chip build-up and a reduction in temperature at the cutting edge, easier cutting and longer life for the finishing tool. If desired the roughing hob may comprise a plurality of sequential cutting edges, each providing some — but not all — of the desired undulations while collectively supplying all of the desired undulations. Such plural cutting edges may be employed to reduce the stress in the hob. They may be on successive teeth or, in a multiple thread hob, on the teeth of the respective threads.

BRIEF DESCRIPTION OF THE DRAWING

FIG. 1 is an end elevation of a hob.

FIG. 2 is a side elevation of the hob.

FIG. 3 is a profile view of the cutting edge of a roughing hob in accordance with this invention as it would be seen along line 3—3 of FIG. 1.

FIG. 4 is a sectional view of a tooth at a constant radius along line 4—4 of FIG. 1.

FIG. 5 shows segments of the profiles of cutting edges of different teeth acting in combination to produce the desired profile.

DESCRIPTION OF THE PREFERRED EMBODIMENT

As shown in FIG. 1 a roughing hob comprises a cylindrical hub 10 with a bore 11 axially therethrough adapted to fit snugly on an arbor (not shown). A keyway 12 is adapted to receive a key (not shown) to drivingly connect the hob to the arbor. As best seen in FIG. 2 a helical thread 13 is formed on the cylindrical surface of the hub. A plurality of flutes, such as 14, are cut through the thread to form a plurality of teeth, such as 15. Each of the teeth is ground on its generating face 16 as determined by the direction of rotation of the hob (as indicated by the arrow A) to provide a cutting edge 17 as seen in FIG. 3 along its profile.

According to the teachings of this invention, the cutting edge 17 has an undulating profile. As shown in FIG. 3 the profile comprises a plurality of substantially straight lines such as 18, 19, 20 intersecting to form alternate peaks 21 and valleys 22 along the sides and a smoothly changing waveform 23 resembling a sine wave at the tip of the tooth. The straight line segments 18, 19, 20 are easiest to produce and are satisfactory where the angles formed at the peaks 21 and valleys 22 are not so sharp as to result in excessive stress concentration. The smoothly rounded waveform 23 is harder to produce, but greatly reduces heat and stress concentration. It is used primarily where there is a substantial change in shape of the finished profile 24 shown in phantom as a dashed line in FIG. 3. In order to reduce stress concentration, the depth of the undulation is small with respect to its length. An envelope 25 of the peaks, such as 21, is shown as dotted line. It must be smaller than the desired finished profile 24 so that some material is left for removal in the finishing operation. An envelope 26 of the valleys, such as 22, is shown in dotted line. It must be smaller than the finished profile 24 by no more than the maximum thickness of material desired to be removed in the finishing operation. It has been found that for best results, the distance between the envelopes 25, 26 of the peaks and valleys, determining the depth of the undulations, should be between approximately 50 to 75 percent of the distance between the valley envelope 26 and the desired finished profile 24.

A hob has a cam relief 27 and a side clearance angle 28 to provide clearance behind the cutting edges, which results in the tooth 15 being shorter and narrower behind the generating face 16. The slope 29 of the profile of the cutting edge 17 throughout its length with respect to a plane 30 perpendicular to the bore 11 must be large enough to produce an acceptable side clearance angle 28. This limitation and the limitation on the depth of the undulation limits the length of the undulation.

The cutting edge 17 described is a continuous cutting edge. In order to reduce stress in the hob teeth, it is sometimes desirable to employ multiple cutting edges having different profiles acting in combination to produce the desired rough profile. FIG. 5 shows segments 31 in solid lines and 32 in dashed lines having staggered peaks and valleys so that each cutting edge cuts part of the desired rough profile. This result may be accomplished by a multiple thread hob with each thread cutting part of the desired rough profile. The same result may be accomplished with a single thread hob if the cutting edge profiles of successive teeth differ and in combination produce the desired rough profile.

I claim:

1. A roughing hob providing for efficient chip breaking in a subsequent finishing operation by leaving a plurality of alternating heavy and light sections to be removed, said hob comprising a cylindrical hub, a thread on said hub, and flutes cut through the thread to form a plurality of teeth in the thread, a cutting edge created on each of said teeth by a respective one of the flutes, a profile of each of said cutting edges comprising a plurality of undulations for generating the alternating heavy and light sections and having a peak envelope approaching a desired finished profile.

2. A roughing hob according to claim 1 wherein the depth of said undulations is approximately 50 to 75 percent of the distance between a valley envelope of said undulations and the desired finished profile.

3. A roughing hob according to claim 1 wherein at least one of the undulations is rounded.

4. A roughing hob according to claim 1 wherein at least one of said undulations comprises intersecting substantially straight lines.

5. A roughing hob according to claim 4 wherein said intersecting lines form alternate peaks and valleys.

6. A roughing hob according to claim 1 wherein said undulations are rounded in a vicinity of substantial change in said desired finished profile and said undulations comprise intersecting substantially straight lines in other than said vicinity.

7. A roughing hob according to claim 1 wherein each of the cutting edges is continuous.

8. A roughing hob according to claim 1 wherein said undulations are relatively shallow with respect to their length.

9. A roughing hob according to claim 1 wherein the profile of each cutting edge throughout its length has a slope greater than a minimum allowable angle providing an acceptable side clearance angle.

10. A roughing hob according to claim 1 wherein a second thread on said hub provides a second plurality of cutting edges comprising a second plurality of undulations in accordance with claim 1, the peaks of said first and second undulations being staggered.

* * * * *